Patented Dec. 14, 1943

2,336,668

UNITED STATES PATENT OFFICE 2,336,668

STABILIZED ETHER

Edgar C. Britton and Gerald H. Coleman, Midland, Mich., assignors to The Dow Chemical Company, Midland, Mich., a corporation of Michigan No Drawing. Application September 28, 1940, Serial No. 358,934

12 Claims. (Cl. 260—611.5)

This invention is concerned with the treatment of aromatic-aliphatic ether halides and is particularly directed to the stabilization of ethers having the formula

wherein R represents an aromatic radical of the benzene series, A represents an alkylene radical containing from 2 to 5 carbon atoms, inclusive, and $n$ is an integer not greater than 3, and the improved compositions thereby obtained.

The expression "aromatic radical of the benzene series" as herein employed is limited in scope to the phenyl radical and homologs and analogs thereof, such as halo-phenyl, phenyl-phenyl, aralkyl-phenyl, alkyl-phenyl, cyclo-alkyl-phenyl, alkoxy-phenyl, etc. and is exclusive of such condensed polynuclear radicals as naphthyl, anthranyl, etc. Representative radicals included by this expression are 2.4.6-trichloro-phenyl, 5-alphaphenylethyl-2-xenyl, 4-tertiarybutyl-phenyl, 2-cyclohexyl-phenyl, 2-phenyl-phenyl, 2-bromo-4-methyl-phenyl, 2-methyl-5-isopropyl-phenyl, 3-propoxy-phenyl, and tolyl (or methylphenyl).

When the aromatic-aliphatic ether chlorides are exposed to the action of air and light, they eventually undergo a partial decomposition with the formation of aldehydic and acidic products. These contaminants impart a disagreeable odor to the ether products and render them somewhat corrosive to metals, whereby their utility as modifiers for plastic compositions and as insecticidal toxicants is greatly reduced.

The problem is of particular importance with respect to halo-phenoxy-alkoxy-alkyl chlorides and especially in the preparation and use of beta-(2.4.6-trichlorophenoxy) - beta' - chloro - diethyl ether. When freshly distilled, the latter compound is substantially odorless and, if stored in amber glass containers, does not develop odor or acidity for long periods. In clear glass or when directly exposed to air and light, an aldehydic odor develops along with appreciable acidity. This undesirable characteristic is particularly noticeable when the compound is purified by fractional distillation in iron equipment as is the general practice in large scale operation.

It is among the objects of the present invention to provide a process for inhibiting the decomposition of the aromatic-aliphatic ether chlorides. A further object is to stabilize such compounds against the development of objectionable odor and corrosion properties. Another object is to provide stabilized ether compositions as hereinafter described.

According to the present invention, the aromatic-aliphatic ether chlorides are stabilized against decomposition and development of undesirable odor and acidity by incorporating therewith one or more aromatic amines or cycloalkyl amines. The proportion in which such addition agent is employed is dependent upon the length of time for which it is desired to stabilize the ether compound and the particular agent or combination of agents selected. While any desired proportion of the amine may be employed, the use of from about 0.02 to about 2.0 per cent by weight thereof in the stabilized composition is generally adequate. From about 0.05 to 0.5 per cent is sufficient in most instances. In the recommended amounts, the presence of such addition agents in the ether compound does not interfere with the use of the latter in plastic compositions. The presence of the stabilizer frequently increases the effectiveness of the ether compound for insecticidal use.

The general method employed in determining the effect of various compounds as stabilizers consisted of introducing 15 to 20 grams of the ether compound containing the stabilizer into a 2-ounce colorless glass bottle having a screw cap closure lined with tin foil. The bottle and contents were then exposed to the rays from a mercury vapor lamp at a distance of about three inches. The samples were inspected from time to time during the period of the test to determine whether or not odor had developed in the ether compound and the general condition of the foil lining of the closure as regards corrosion. Controls were run on samples of the ether compound without stabilizer. As the stability of the control materials employed varied considerably, depending upon the exact method of purification and general handling prior to the determination, the results set forth in the following examples are grouped so as to be readily compared with the control results peculiar to the determinations concerned.

Example 1

Beta-(2.4.6-trichlorophenoxy)-beta'-chloro-diethyl ether samples were modified with small amounts of amines and exposed to the light rays from a mercury vapor lamp as previously described. A control sample developed an offensive aldehyde and acid odor within 6 hours. At the end of 17 hours the metal cap to the bottle containing the control sample was badly corroded. A sample containing 0.1 per cent of 4-amino-phenol did not develop any odor or cause any corrosion of the metal cap lining after 17 hours' exposure, and a similar amount of 4-N-benzyl-amino-phenol kept a sample free from odor and corrosive tendencies for 53 hours. A portion of the ether compound containing 0.25 per cent by weight of cyclohexylamine showed no decomposition after 17 hours' exposure, while 0.5 per cent by weight of dicyclohexylamine stabilized the ether compound as regards odor and corrosion for more than 53 hours under the conditions of the accelerated test. In this and the following determinations, reference to odor is directed particularly to aldehyde or acid odor produced by decomposition of the subject chloro ether compound. Not infrequently the amines employed as stabilizers imparted a slight characteristic odor to the composition. This odor was not objectionable and did not, in any way, indicate decomposition of the ether compound.

*Example 2*

In similar determinations, other aromatic and cycloalkyl amines were employed to modify beta-(2.4.6-trichlorophenoxy) - beta' - chloro - diethyl ether. The following table sets forth the results obtained with representative stabilized compositions.

Aromatic-aliphatic ether chlorides which may be substituted for the compound set forth in the examples are beta-(5-alpha-phenyl-ethyl-2-xenoxy)-beta'-chloro-diethyl ether, beta-(4-tertiary-butyl-phenoxy)-beta'-(2 - chloroethoxy) - diethyl ether, beta-phenoxy-beta'-(2-chloroethoxy) - diethyl ether, beta-(4-tertiarybutyl-phenoxy)-ethyl chloride, beta-(2.4.6-trichlorophenoxy)-propyl chloride, gamma-(2-cyclohexylphenoxy)-propyl chloride, beta-(2-xenoxy)-n-butyl chloride, beta-(2-bromo-4 - methyl - phenoxy)-n-amyl chloride, beta-(2-methyl - 5 - isopropyl - phenoxy) - beta'-chloro-dipropyl ether, gamma-(3-propoxy-phenoxy)-gamma'-chloro-dipropyl ether, delta-tol-oxy-delta'-chloro-di-n-butyl ether, omega-(4-tertiary- -butyl - phenoxy)-omega' - chloro - diamyl ether, and other chloroethyl, chloro-propyl, chloro-butyl, chloro-alkoxyalkyl, and chloro-poly-alkoxyalkyl ethers of phenols.

The expressions "aromatic amine" and "cycloalkyl amine" as herein employed refer to those aromatic and cycloalkyl nitrogen compounds in which a phenyl, naphthyl, or cycloalkyl radical is directly attached to an amino group and which do not contain sulfur in the molecule.

We claim:

1. The process which comprises dissolving a member of the class consisting of aromatic amines

| Stabilizing agent | Conc. in per cent by weight | Result of exposure to accelerated test ||
|---|---|---|---|
| | | Odor | Corrosion |
| Aniline | 0.1 | None after 547 hours | None after 163 hours. Metal surface slightly dulled after 547 hours. |
| N.N.-dimethyl-aniline | 0.1 | None at 163 hours. Smelled slightly of aldehyde after 547 hours. | None at 163 hours. Slightly dulled after 547 hours. |
| N.N.-diethyl-aniline | 0.1 | None after 163 hours. Smelled slightly of aldehyde after 547 hours. | None after 163 hours. Surface beginning to be affected after 547 hours. |
| Diphenylamine | 0.1 | Very slight aldehyde odor after 163 hours. Trace of odor after 547 hours. | None at 163 hours. Very slight corrosion after 547 hours. |
| Control | | Distinct aldehyde odor after 163 hours. Strong aldehyde and acid odor after 547 hours. | Surface badly attacked after 163 hours. Metal completely disintegrated after 547 hours. |
| 2-methylcyclohexylamine | 0.1 | None at 523 hours | None at 523 hours. |
| N.N'-di-(2-methylcyclohexyl)-piperazine | 0.1 | ___do___ | None at 139 hours. Surface beginning to be affected at 523 hours. |
| N-(2-phenoxy-ethyl)-aniline | 0.1 | None at 139 hours | None at 139 hours. |
| Beta-naphthylamine | 0.1 | None at 523 hours | None at 139 hours. Surface beginning to be affected at 523 hours. |
| Control | | Both aldehyde and hydrogen chloride distinguishable at 139 hours. | Badly corroded at 139 hours. |

Aliphatic amine compounds and aliphatic and aromatic amines containing sulfur in the molecule were found to be relatively ineffective as stabilizers and, in certain instances, to accelerate the decomposition of the ether compounds.

A copending application Serial No. 349,224, filed August 1, 1940, of which the present application is a continuation-in-part, discloses the utilization of a number of organic amine compounds and particularly cyclohexylamine salts of phenols in the stabilization of the aromatic-aliphatic ether chlorides. As in the present instance, the stabilizers are effective in concentrations of from about 0.02 to 2.0 per cent by weight of the labile ether compound. Representative of such compounds are the dicyclohexylamine salts of 4-tertiarybutyl-catechol, 4-tertiarybutyl-phenol, pentachlorophenol, 2-chloro-6-phenylphenol, 4.4'-dihydroxydiphenyl, and the like.

Other compounds which may be employed in the stabilization of the aromatic-aliphatic ether chlorides substantially as described in the foregoing examples are 4-amino-diphenyl, phenetidine, 4-chloro-aniline, paraphenylene-diamine, 4-tertiarybutyl-aniline, 4-cyclohexyl - cyclohexylamine, n-methylcyclohexylamine, n-cyclohexyl-aniline, etc.

and cycloalkyl amines in an aromatic-aliphatic ether chloride having the formula

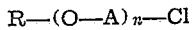

wherein R represents an aromatic radical of the benzene series, A represents an alkylene radical containing from 2 to 5 carbon atoms, inclusive, and $n$ is an integer not greater than 3, the amount of amine being sufficient to stabilize the ether and to inhibit the development of corrosive and odoriferous decomposition products therein.

2. A composition of matter comprising an ether having the formula

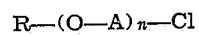

wherein R represents an aromatic radical of the benzene series, A represents an alkylene radical containing from 2 to 5 carbon atoms, inclusive, and $n$ is an integer not greater than 3, and sufficient of a compound selected from the group consisting of aromatic amines and cycloalkyl amines to inhibit the development of corrosive and odoriferous decomposition products therein.

3. A composition of matter comprising an ether having the formula

wherein R represents an aromatic radical of the benzene series, A represents an alkylene radical containing from 2 to 5 carbon atoms, inclusive, and $n$ is an integer not greater than 3, and sufficient of an aromatic amine to inhibit the development of corrosive and odoriferous decomposition products therein.

4. A composition of matter comprising an ether having the formula $$R-(O-A)_n-Cl$$

wherein R represents an aromatic radical of the benzene series, A represents an alkylene radical containing from 2 to 5 carbon atoms, inclusive, and $n$ is an integer not greater than 3, and sufficient of a cycloalkyl amine to inhibit the development of corrosive and odoriferous decomposition products therein.

5. A composition of matter comprising an ether having the formula $$R-O-C_2H_4-O-C_2H_4-Cl$$

wherein R represents an aromatic radical of the benzene series, and sufficient of a compound selected from the group consisting of aromatic amines and cycloalkyl amines to inhibit the development of corrosive and odoriferous decomposition products therein.

6. A composition of matter comprising beta-(2.4.6-trichloro-phenoxy)-beta'-chloro-diethyl ether and sufficient of a compound selected from the group consisting of aromatic amines and cycloalkyl amines to inhibit the development of corrosive and odoriferous decomposition products therein.

7. A composition of matter comprising an ether having the formula $$R-(O-A)_n-Cl$$

wherein R represents an aromatic radical of the benzene series, A represents an alkylene radical containing from 2 to 5 carbon atoms, inclusive, and $n$ is an integer not greater than 3, and between 0.02 and 2.0 per cent by weight of an aromatic amine.

8. A composition of matter comprising an ether having the formula $$R-(O-A)_n-Cl$$

wherein R represents an aromatic radical of the benzene series, A represents an alkylene radical containing from 2 to 5 carbon atoms, inclusive, and $n$ is an integer not greater than 3, and between 0.02 and 2.0 per cent by weight of a cycloalkyl amine.

9. A composition of matter comprising beta-(2.4.6-trichloro-phenoxy)-beta'-chloro-diethyl ether and between 0.02 and 2.0 per cent by weight of an aromatic amine.

10. A composition of matter comprising beta-(2.4.6-trichloro-phenoxy)-beta'-chloro-diethyl ether and between 0.02 and 2.0 per cent by weight of a cycloalkyl amine.

11. A composition of matter comprising an ether having the formula:

$$X-(O-A)_n-Cl$$

wherein X represents a halo-aromatic radical of the benzene series, A represents an alkylene radical containing from 2 to 5 carbon atoms, inclusive, and $n$ is an integer not greater than 3, and sufficient of a compound selected from a group consisting of aromatic amines and cycloalkyl amines to inhibit the development of corrosive and odoriferous decomposition products therein.

12. A composition of matter comprising a halo-phenoxy-alkoxy-alkyl chloride and sufficient of a compound selected from the group consisting of aromatic amines and cycloalkyl amines to inhibit the development of corrosive and odoriferous decomposition products therein.

EDGAR C. BRITTON.
GERALD H. COLEMAN.